United States Patent
Thinguldstad et al.

(10) Patent No.: US 11,322,267 B2
(45) Date of Patent: May 3, 2022

(54) FAULT TOLERANT TURBINE SPEED CONTROL SYSTEM

(71) Applicant: GE-Hitachi Nuclear Energy Americas LLC, Wilmington, NC (US)

(72) Inventors: Arthur M Thinguldstad, Wilmington, NC (US); Mark A. Bergman, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 190 days.

(21) Appl. No.: 16/416,501

(22) Filed: May 20, 2019

(65) Prior Publication Data

US 2020/0027595 A1  Jan. 23, 2020

Related U.S. Application Data

(62) Division of application No. 13/289,301, filed on Nov. 4, 2011, now Pat. No. 10,311,985.

(51) Int. Cl.

| | | |
|---|---|---|
| *G21C 15/18* | (2006.01) | |
| *G21D 1/02* | (2006.01) | |
| *G21D 3/08* | (2006.01) | |
| *F01D 1/20* | (2006.01) | |
| *G21D 3/04* | (2006.01) | |
| *F01D 1/14* | (2006.01) | |

(52) U.S. Cl.
CPC .............. *G21C 15/185* (2019.01); *F01D 1/20* (2013.01); *G21C 15/182* (2013.01); *G21D 1/02* (2013.01); *G21D 3/04* (2013.01); *G21D 3/08* (2013.01); *F01D 1/14* (2013.01); *Y02E 30/30* (2013.01)

(58) Field of Classification Search
CPC ................................. G21C 15/182; G21D 3/06
See application file for complete search history.

(56) References Cited

U.S. PATENT DOCUMENTS

| | | | | |
|---|---|---|---|---|
| 4,368,520 A | * | 1/1983 | Hwang | F01D 17/24 700/289 |
| 4,818,475 A | * | 4/1989 | Gluntz | G21C 15/18 376/282 |
| 5,116,567 A | * | 5/1992 | Fennern | G21C 15/24 376/433 |
| 5,120,494 A | * | 6/1992 | Nazareno | F04D 7/08 376/282 |
| 5,268,939 A | * | 12/1993 | Tang | F01K 9/04 376/210 |
| 5,309,485 A | * | 5/1994 | Chao | G21D 3/001 376/215 |

(Continued)

*Primary Examiner* — Sharon M Davis
(74) *Attorney, Agent, or Firm* — Ryan Alley IP

(57) ABSTRACT

A generator is installed on and provides electrical power from a turbine by converting the turbine's mechanical energy to electricity. The generated electrical power is used to power controls of the turbine so that the turbine can remain in use through its own energy. The turbine can be a safety-related turbine in a nuclear power plant, such that, through the generator, loss of plant power will not result in loss of use of the turbine and safety-related functions powered by the same. Appropriate circuitry and electrical connections condition the generator to work in tandem with any other power sources present, while providing electrical power with properties required to safely power the controls.

5 Claims, 2 Drawing Sheets

(56) References Cited

U.S. PATENT DOCUMENTS

| | | | | |
|---|---|---|---|---|
| 5,547,337 A | * | 8/1996 | Fork | H02P 9/04 |
| | | | | 415/1 |
| 5,621,776 A | * | 4/1997 | Gaubatz | G21D 3/04 |
| | | | | 376/242 |
| 2013/0044851 A1 | * | 2/2013 | Winters | G21C 15/182 |
| | | | | 376/299 |

* cited by examiner

FAULT TOLERANT TURBINE SPEED CONTROL SYSTEM

RELATED APPLICATIONS

This application is a divisional of, and claims priority under 35 U.S.C. § 120 to, co-pending U.S. patent application Ser. No. 13/289,301 filed Nov. 4, 2011, now U.S. Pat. No. 10,311,985, which is incorporated herein by reference in its entirety.

BACKGROUND

FIG. 1 is a schematic diagram of a conventional turbine control system in commercial nuclear power stations. As shown in FIG. 1, a turbine 100 receives source steam 101, extracts thermodynamic energy from the source steam 101, and outputs lower-pressure, saturated steam 102. Source steam 101 may be from a nuclear reactor, a heat exchanger, a steam generator, a higher-pressure turbine etc. Turbine 101 may be any turbine found in nuclear power plants, including a lower-output Reactor Core Isolation Cooling (RCIC) turbine or higher-output High Pressure Injection Cooling (HPIC) turbine, for example. The extracted energy 105 is used to power desired components; for example, in the case of an RCIC and HPIC, extracted energy 105 provides power to associated RCIC and HPIC cooling pumps that maintain flow and water levels in a reactor.

When a turbine 100 is used to run cooling systems to maintain reactor coolant levels and remove decay heat from the plant, such as in a transient scenario, turbine 100 is controlled by a speed controller 60. Turbine 100 generates speed information based on load and output and transmits speed information signals 61 to speed controller 60. Speed controller 60 generates speed control signals 62 based on received speed information signals 61 to be transmitted back to turbine 100. Speed information signals 61 permit turbine 100 to operate at specified speeds and loads to avoid tripping and provide adequate power 105 to desired destinations. Speed controller 60 is conventionally networked with a flow controller 55 in the plant control room, which exchanges flow control signals 56 with the speed controller 60. In this way, plant operators may monitor and input speed commands through the control room flow controller 55 that are translated into speed control signals 62 by speed controller 60 and ultimately control turbine 100 to perform in accordance with control room commands.

Control room flow controller 55 and speed controller 60, and data and signals generated thereby, are conventionally powered by offsite or plant power. As shown in FIG. 1, when such power is unavailable, such as during a station blackout event, a plant emergency power distribution source 50, such as a local diesel generator or battery, may provide electrical output 51 to control room flow controller 55 and speed controller 60. By offering local power, emergency power distribution source 50 may permit operators to continuously control a speed of and use turbine 100 to manage the transient and/or provide power to safety systems, including Core Isolation and High Pressure Injection Cooling pumps.

SUMMARY

Example embodiments include methods and systems for controlling turbine speed using the turbine's own power such that offsite power or local emergency power are not required to operate the turbine. Example systems include a generator connected to the turbine and generating power therefrom and connected to a controller for the turbine, such as a speed controller or control room flow controller governing turbine behavior. The generator may be of any appropriate power, voltage, frequency, etc. to power the controller and any other desired system. Example embodiments may further include circuitry connecting the generator, controller, and plant emergency power with isolation diodes between each power source and a filter to provide electrical power having properties required to power the controller.

By installing and using a generator on a turbine in a nuclear power plant to power turbine controllers, the turbine may be operated and controlled through its own power without concern for offsite or local power. If the turbine drives safety-related pumps like RCIC or HPIC, at least the turbine may be operated and controlled through example embodiments and methods by plant operators to provide emergency cooling to a reactor that has lost offsite and onsite emergency power, as long as the turbine can be driven by decay heat or other steam sources. This may greatly extend core cooling capacity in some accident scenarios while eliminating any need for manual intervention to operate safety-related turbines.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
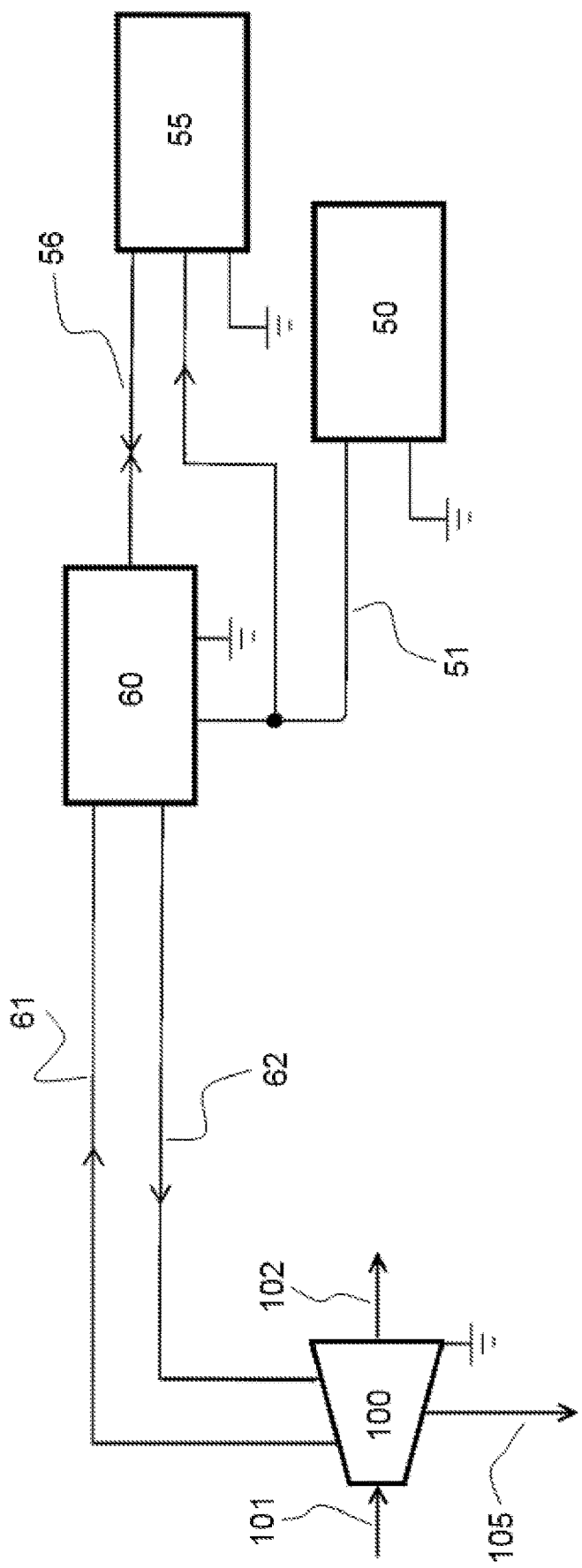
FIG. 1 is a schematic diagram of a conventional commercial nuclear reactor turbine flow control system.

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the terms "and," "or," and "and/or" include all combinations of one or more of the associated listed items unless it is clearly indicated that only a single item, subgroup of items, or all items are present. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and the are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

Applicants have recognized plant emergency power distribution system 50 may become unavailable during plant transients. Indeed, it may be possible that the same transient event that cuts offsite power may render unusable emergency power distribution system 50. In such a situation, turbine 100 may not be monitored, controlled, or potentially even used by plant operators in the control room to provide power output 105 to emergency systems or otherwise, because turbine speed controller 60 and/or control room flow controller 55 lack emergency power. Applicants have further recognized that turbine 100 itself may provide emergency electrical output if all other offsite and onsite power are lost, and that such power, if properly diverted, may be used to power speed controller 60 and control room flow controller 55, such that operators may use turbine 100 to manage a plant transient even in the event of loss of all other power. Example embodiments and methods discussed below enable these and other advantages and solutions to situations appreciated by Applicants.

Figure 2:
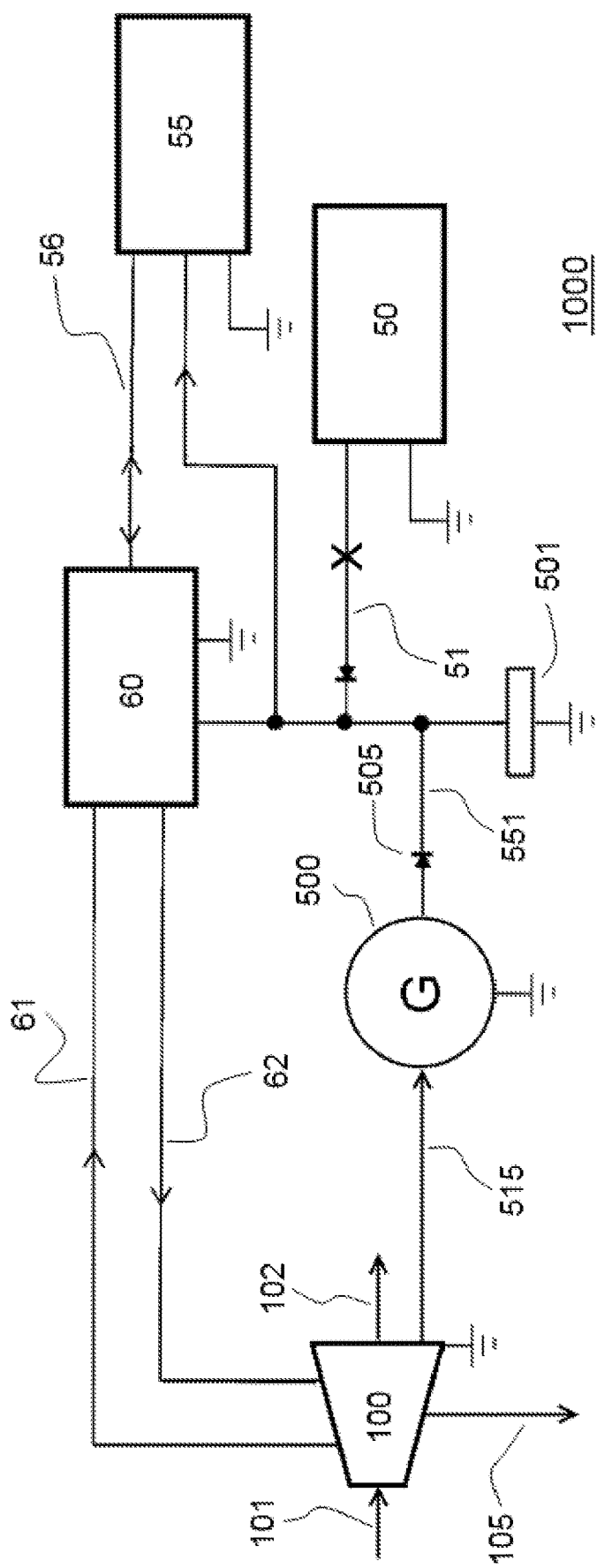
FIG. 2 is a schematic diagram of an example embodiment fault tolerant turbine speed control system.

FIG. 2 is a schematic drawing of an example embodiment fault tolerant turbine speed control system 1000. As shown in FIG. 2, an electrical generator 500 is installed on turbine 100 and electrically connected to speed controller 60 and control room flow controller 55. Generator 500 may be any type of generator, including AC or DC power generators, capable of generating voltage from mechanical energy 515 of turbine 100. Generator 500 may be installed along a turbine shaft of turbine 100 and generate electrical power 551 from mechanical energy 515 output on the shaft. Existing mechanical output 105 may still be produced by turbine 100 in example embodiments.

Generator 500 may be capable of delivering any amount of electrical power 551 that is sufficient to power connected systems, such as speed controller 60 and/or control room flow controller 55. For example, generator 500 may be a 200 W DC generator that can power both speed controller 60 and control room flow controller 55 conventionally installed in nuclear power plants. Of course, generator 500 may have a much larger or smaller wattage, depending on need and mechanical power output of turbine 100. If functionality of turbine 100 is desired for other components, such as coolant pumps powered by turbine output 105, generator 500 may be rated at an electric power less than a difference between turbine 100's capacity and required output 105. For example, a 1 kW DC generator may power additional systems while not interfering with operations of a larger turbine 100.

As shown in FIG. 2, generator 500 is electrically connected to turbine controllers, such that if electrical output 51 from emergency power distribution system 50 becomes unreliable or unavailable (as indicated by "X" in FIG. 2), electrical power 551 from generator 500 may supplement or replace electrical output 51 from emergency systems. Generator 500 may be electrically connected to a plant power network and thus electrically power plant components by installing an electrical connection or circuit between generator 500 and the network.

Isolation diodes 505 and/or filter 501 may be installed or configured as desired to provide effective electrical current, voltage, power, frequency, timing, etc. to all components connected to the network. Isolation diodes 505 and/or filter 501 may ensure that such electrical power supplementing or replacing power from emergency power distribution system 50 matches voltage and power characteristics required to safely run emergency systems like generator 500, speed controller 60, control room flow controller 55, and/or any other plant component that can be powered by electricity from generator 500. Isolation diodes 505 may also ensure that power from generator 500 can reach consuming components on the electrical network regardless of malfunction or complete loss of emergency power distribution system 50. For example, isolation diodes 505 may prevent or reduce reverse current surges to generator 500 and/or emergency power distribution system 50 so as to prevent damage or ineffectiveness in those components. Filter 501, which may be a capacitor or battery, for example, may be grounded and smooth current and voltages applied to speed controller 60, control room flow controller 55, and any other component being powered by generator 500.

Alternatively, generator 500 may be directly electrically connected to desired components such as speed controller 60 and/or control room flow controller 55 so that those components may themselves switch to generator 500 electrical power 551 in the instance of failure of plant emergency power distribution system 50.

As shown in FIG. 2, when speed controller 60 and/or control room flow controller 55 are powered by turbine 100 through generator 500, plant operators may continuously operate turbine 100 by monitoring and controlling the speed of the same from the control room via signals 61, 62, and/or 56. In this way, turbine 100, and its output 105, may be used even with a total failure of plant emergency power distribution system 50. If turbine 100 is an RCIC, HPIC, or other transient- or safety-related turbine, mechanical power output 105 may be maintained to emergency systems, such as an RCIC or HPIC pump, through example systems using generator 500. As long as a steam source 101 is available, such as from decay heat from a reactor or other source, turbine 100 may operate and be controllable in example systems, regardless of complete loss of station power and emergency electrical backups. As such, example system 1000 may permit prolonged use and control of turbine 100 to power other emergency systems that preserve reactor or plant integrity during a transient event.

Example embodiments and methods thus being described, it will be appreciated by one skilled in the art that example embodiments may be varied and substituted through routine experimentation while still falling within the scope of the following claims. For example, although example embodiments are described in connection with RCIC or HPIC turbines in nuclear power plants, it is understood that example embodiments and methods can be used in connection with any turbine where loss of power affects the ability to control and/or use the turbine. Such variations are not to be regarded as departure from the scope of the following claims.

What is claimed is:

1. A method of operating a nuclear power plant, the method comprising:
    installing an electrical generator on a reactor coolant pump turbine so that the electrical generator can generate electricity from the turbine, wherein the generator is rated at 200 W or less electric; and
    electrically connecting the electrical generator to an emergency power distribution system electrically connected to a speed controller configured to monitor a speed of the turbine and control a speed of the turbine and a control room flow controller configured to receive turbine information from the speed controller and transmit turbine speed commands to the speed controller.

2. The method of claim 1, further comprising: operating the turbine with the controllers using electrical power from the electrical generator.

3. The method of claim 2, wherein the operating is performed in a control room remote from the turbine and the generator.

4. The method of claim 2, wherein the operating is performed during a loss of offsite power where the plant does not have access to grid electricity or an onsite emergency electricity source.

5. The method of claim 2, wherein the emergency power distribution system includes isolation diodes configured to prevent current flow to the generator and to an onsite emergency electricity source.

* * * * *